United States Patent

[11] 3,579,266

[72] Inventors James E. Berardy
Daly City;
David A. Weinstein, Berkeley, Calif.
[21] Appl. No. 726,772
[22] Filed May 6, 1968
[45] Patented May 18, 1971
[73] Assignee Rollin J. Lobaugh, Inc.

[54] AUTOMATIC ADDING MACHINE
33 Claims, 14 Drawing Figs.

[52] U.S. Cl. .......... 235/61.6, 340/166
[51] Int. Cl. .......... G06k 15/02, H04q 1/00
[50] Field of Search .......... 235/61.6, 61.9, 61.11, 61.115; 340/174, 166

[56] References Cited
UNITED STATES PATENTS

| | | | |
|---|---|---|---|
| 3,106,635 | 10/1963 | Williams et al. .......... | 235/61.6 |
| 3,229,073 | 1/1966 | Macker et al. .......... | 235/61.11 |

*Primary Examiner*—Daryl W. Cook
*Attorney*—Warren, Rubin, Brucker and Chickering

ABSTRACT: An automatic adding machine for reading, accumulating, and printing data from media such as punched tape and cards, magnetic tape and the like. A read and feed mechanism sequentially decodes the data from the media and transmits data responsive signals to a matrix where all data from a set of data such as a punched card is stored. An adding machine or like accumulation device is coupled with the matrix sand has a plurality of electrically actuated digit keys. The matrix includes a memory cell for each digit key. Electric command circuits are responsive to data decoded by the read and feed mechanism, are synchronized therewith and include a second memory system which permits storage of command signals from the read and feed mechanism so that the command data can be read prior to the reading of the data stored in the matrix. Upon completion of the reading of the set of data, one of the command circuits is energized to select the operating mode of the adding machine such as the add, subtract, etc. mode. At the same time, data stored in the matrix is fed into the adding machine whereby the data is accumulated therein and printed out. To prevent loss of data due to an asynchronism between the adding machine operating cycle and the operating cycle of the read-feed mechanism the duration of the former is shorter than that of the latter while the commencement of both cycles is interdependent.

Patented May 18, 1971 3,579,266

6 Sheets-Sheet 1

INVENTORS
James E. Berardy
David A. Weinstein
BY Warren, Rubin, Brucker & Chickering
Their Attorneys INVENTORS
James E. Berardy
David A. Weinstein
BY Warren, Rubin, Brucker & Chickering
Their Attorneys INVENTORS
James E. Berardy
BY David A. Weinstein
Warren, Rubin, Brucker & Chickering
Their Attorneys

Patented May 18, 1971 3,579,266

6 Sheets-Sheet 4

INVENTORS
James E. Berardy
David A. Weinstein
BY Harris, Rubin, Brucker & Chickering,
Their Attorneys Patented May 18, 1971

3,579,266

6 Sheets-Sheet 5

INVENTORS
James E. Berardy
David A. Weinstein
BY Warren, Rubin, Brucker & Chickering,
Their Attorneys Patented May 18, 1971 3,579,266

6 Sheets-Sheet 6

INVENTORS
James E. Berardy
David A. Weinstein
BY Warren, Rubin, Brucker & Chickering
Their Attorneys

AUTOMATIC ADDING MACHINE

RELATED APPLICATIONS

This application is related to the commonly owned patent application bearing Ser. No. 685,737, filed Nov. 22, 1967.

BACKGROUND OF THE INVENTION

1. Field of the Invention

This invention relates to automatic adding machines and more particularly to high-speed, electronically controlled automatic adding machines operated by coded media such as punched cards.

2. State of the Prior Art

Throughout industry, government agencies, educational institutions, etc. exceedingly large numbers of data must be collected and accumulated. Usually this data is stored on punched cards, tapes, magnetic tapes, etc., is read out therefrom and then added or subtracted and totaled. The operation is relatively simple. Although it can be speedily performed on frequently available sophisticated computer machines the high cost of such computers does not justify their tie-up on such simple tasks. Consequently, most of the simple data accumulation operations are presently done manually. Manual operation is slow and subject to human errors which, if the accumulated data is large, are frequently difficult to detect and, therefore, quite expensive.

To speed up the accumulation process and reduce the cost of accumulating data, automatic adding machines have been devised in the past. They take various forms, some of which are too expensive to be commercially feasible and replace the presently practiced hand operation. One automatic adding machine employs a standard commercially available and electrically powered adding machine which is coupled to a read and feed mechanism for data stored on punched cards. The read and feed mechanism as well as the adding machine are synchronized and mechanically coupled so that the data from each card is fed into the adding machine and there accumulated. This device shows excellent operating characteristics within the limited range contemplated by automatic adding machines. For example, it is capable of processing up to 200 cards and more per minute while manually operated adding machines process about 25 cards a minute and other automatic adding machines process no more than about 40 cards per minute. As compared to prior practices, time and cost savings are substantial.

The large number of mechanical components makes this automatic adding machine relatively heavy and distracts somewhat from its portability. In addition, the mechanical components are subject to wear, require constant maintenance and must be constructed of relatively expensive materials to prevent their failure from fatigue after extended operating periods. Their assembly is tedious and time consuming and such adding machines are, therefore, relatively expensive.

SUMMARY OF THE INVENTION

The present invention provides an automatic adding machine in which data read out from an automatic read-feed mechanism is electronically monitored, classified, and fed into an electrically powered adding machine where the data is accumulated. Briefly, the automatic adding machine includes a sequentially operating data read mechanism and a matrix operatively coupled with the read mechanism for receiving and classifying read data. Means operatively coupled with the matrix are provided for accumulating sets of data received from the matrix.

In the preferred form of this invention, the matrix includes a built-in memory which stores data received from the read mechanism until a set of data is complete. Thereafter, selected solenoid operated digit keys of the accumulating means are energized and the means are cycled to accumulate the set of data therein. The matrix has a memory cell for each digit key and each such cell includes an electric circuit having an inductor coil of the digit key solenoid disposed therein. This arrangement is preferred because it permits the simultaneous energization of all solenoids for only short periods of time. If no memory were included in the matrix, some of the solenoids must be energized for relatively long time periods due to the sequential readout of the read mechanism. In the latter instance, the inductor coils of the solenoid would draw relatively large currents and might burn out after relatively short operating times.

The matrix includes rows and columns of cells; the rows corresponding to the number of digits of the accumulating means; and the columns, numbering 10, one for each number from zero to nine. Thus, in an automatic adding machine with 10 digits, there are either 10 rows and 10 columns corresponding to 100 digit keys of the accumulating means or, if zero automatically occurs in the absence of a signal for another number, then there are only nine columns in the matrix.

In operation, one row of the matrix is energized at a time by a row switch which is synchronized with the read mechanism. Preferably, the row switch includes a plurality of circularly arranged conductors, each conductor corresponding to one row of the matrix, and a contact rotatable relative to the conductors for sequentially subjecting each conductor, and thereby each row of the matrix, to an electric potential. To assure perfect synchronization between the read mechanism and the row switch, relative rotational movement between the conductors and the contacts is provided through a mechanical interlock between the row switch and a drive shaft of the read mechanism.

The accumulating means is preferably a commercially available, mass produced and, therefore, relatively inexpensive adding machine. It is characterized by being electrically powered and having solenoid operated digit keys. To actuate the several operating modes of the adding machine, such as the adding, subtracting, totaling, etc. modes, a plurality of electric command circuits are provided and energized by the read mechanism. Data stored on cards in the form of punched-out holes is read by the read mechanism and transformed into electric signals which in turn actuate one of the command circuits to select the applicable operating mode of the adding machine. Operation of the adding machine as well as the feed out of data stored in the memory matrix is, on the other hand, controlled by cam actuated switches. To assure synchronization between the read mechanism and the actuation of the cam operated switches, the cams are mounted on a drive shaft of the read mechanism, preferably the same as that which operates the row switches of the read mechanism.

To avoid a loss of data from an asynchronism between the read mechanism, the row switch, the command circuits and the cam operated actuating switches on the one hand and the adding machine on the other, the operating cycle of the read mechanism for reading one set of data is adjusted so that it is longer than the operating cycle of the adding machine. At the same time, the commencement of both cycles are interdependent through use of a common control element, preferably the drive shaft of the read mechanism. In this way, the accumulation of any asynchronism which might occur and which could otherwise build up and cause data loss is prevented from existing for more than one cycle before being corrected.

In one embodiment of this invention, the read mechanism includes a pair of read stations which permit the comparison of a pair of cards, or sets of data, and which is capable of determining whether or not the two cards belong to the same or to different, larger sets of data. If the latter is the case, a control circuit is energized to signal the adding machine to operate in its subtotaling or in its totaling mode and to cycle it. Normally, the printout mode of the adding machine will also be operated. This provides automatic subtotals for each larger set of data and further enables automatic and continuous operation of the automatic adding machines even though the supplied data is not all of the same kind. Thus, if the adding machine is used in an industrial concern to compile inventories or to accumulate billings by classes of customers, for example, one stack of cards containing several layers each belonging to a different type of inventory or a different class of customers may be inserted into the machine. The data read out by the read mechanism, however, is grouped into the corresponding classes by the double station read mechanism and the compare circuit of the machine.

Since each time a noncompare occurs, the adding machine must be cycled while no additional data can be fed to it, the control circuit further operates to temporarily disable the read and feed mechanism during this one cycle. Otherwise, a loss of data stored in the matrix and belonging to the previously read card ensues.

This automatic adding machine is lightweight and, therefore, easily portable since it does not have large numbers of relatively heavy mechanical operating components. The electronic transmission of signals from the read mechanism enables high-speed operation which is only limited by the obtainable speed from the read-feed mechanism and the adding machine employed. Moreover, assembly costs of the machine is substantially less than the cost for assembling mechanically operated machines because mass produceable components, such as printed circuits, for example, can be employed. At the same time, maintenance costs as well as the danger of failure of mechanical components from fatigue and wear and ensuing down times are substantially reduced or eliminated.

The provision of the matrix allows the sequential reading of the rows of each card instead of the sequential reading of the much larger number of columns, as is conventional. The sequential reading of the row requires that the machine has a built-in memory for storing the information until all rows have been scanned before the data can be fed into the adding machine. Since normal cards, say standard IBM cards, have 80 columns but only 13 rows, the sequential reading of the rows permits the processing of each card in approximately one-sixth the time that would be required if the cards were scanned in the conventional manner. The data processing capacity of the machine is thereby substantially increased and results in corresponding reduction in its operating costs.

Thus, the present invention provides a data processing machine having a limited capability directed to performing operations frequently required by business and governmental agencies and which have heretofore been performed manually due to the nonavailability of suitable, low-cost and high capacity machines. It most completely fills the above described long-felt need in the field of data processing.

DESCRIPTION OF THE PREFERRED EMBODIMENT

Figure 8:
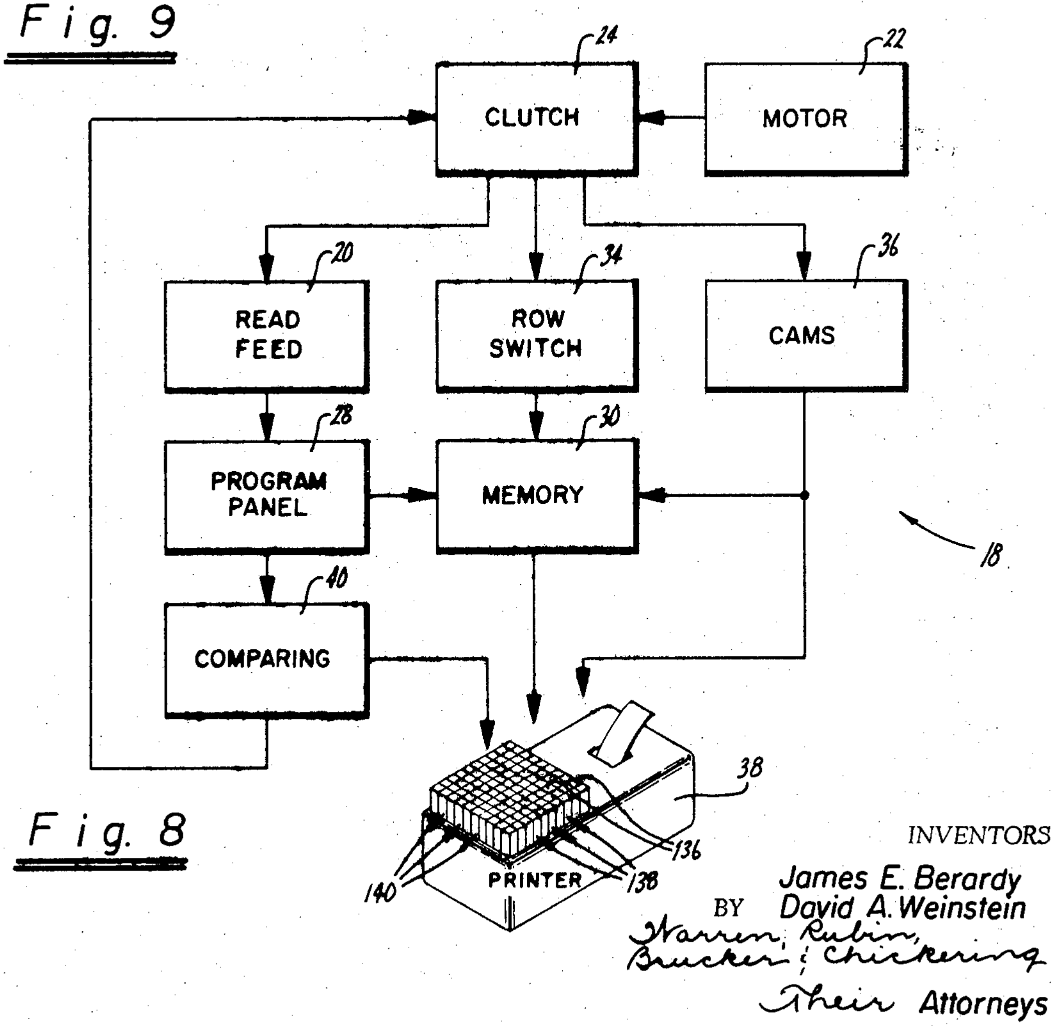
FIG. 8 is a schematic block diagram illustrating the functions performed by the automatic adding machine of the present invention.

Referring first to FIG. 8, the functions performed by an automatic adding machine 18 constructed according to the present invention are set forth. A read-feed mechanism 20 (seen in more detail in FIG. 1) is disengagably coupled with a motor 22 through a clutch 24. The clutch is of the type which can only release the read-feed mechanism from the motor when the former is in its original or zero position. Punched cards 26 (shown in FIG. 1) are transported to the read-feed mechanism in the direction of their short sides 27 (shown in FIG. 1) and are there decoded. In the preferred embodiment of this invention, the read-feed mechanism is constructed as that disclosed in the above-referred to copending patent application. Electric output signals from the read-feed mechanism are transmitted to a conventional program panel or plug board 28 which is wired according to the prior art. The signals are transmitted from the plug board to a matrix 30 provided with a memory where the signals are temporarily stored.

Figure 10:
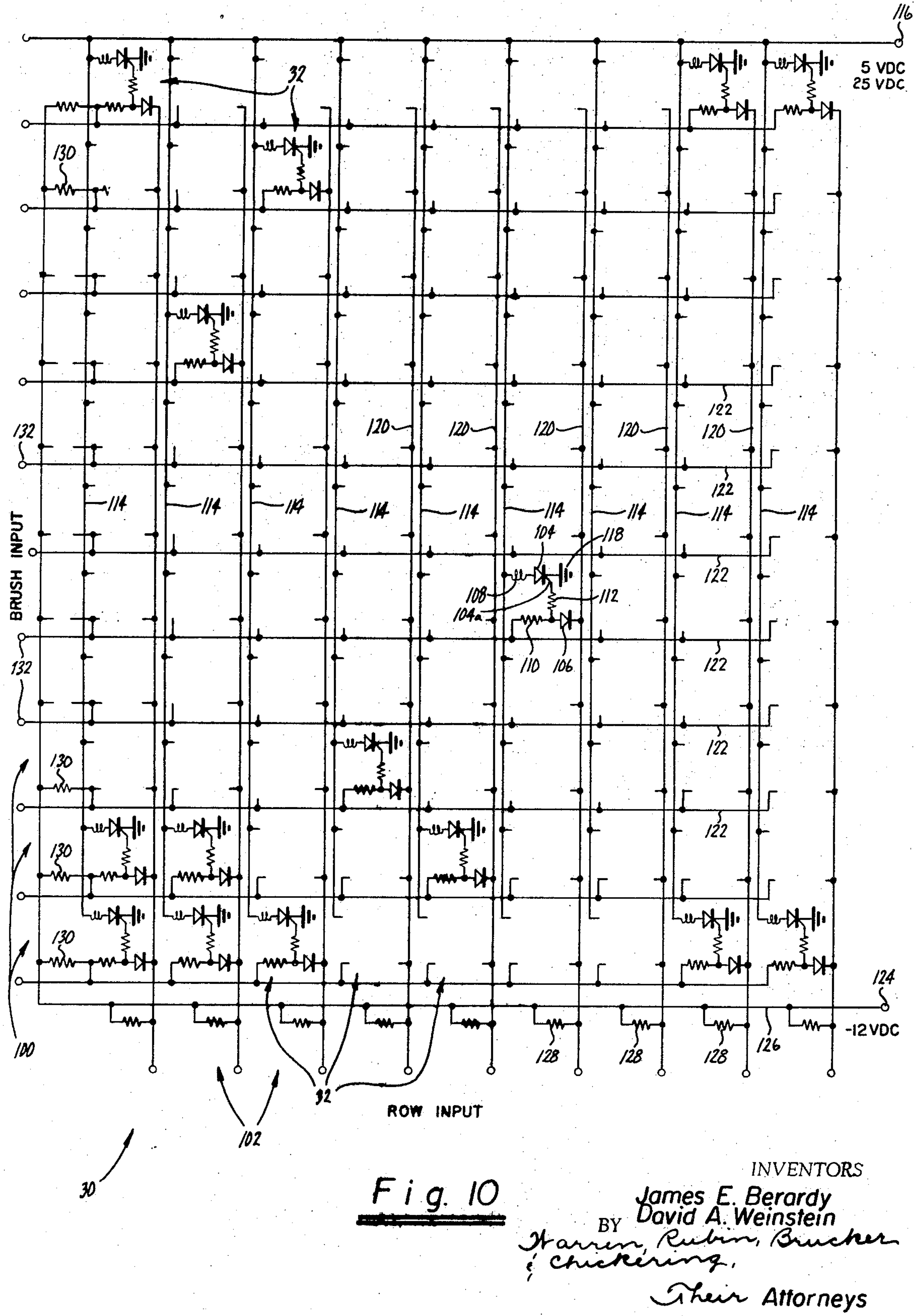
FIG. 10 is a schematic wiring diagram of a matrix with a memory function as employed by the automatic adding machine of this invention.

The matrix includes a plurality of cells 32 independent from each other (shown in FIG. 10). Data is received and stored only in those cells in which the electric signals from the plug boards coincide with an electric signal from a row switch 34. Each excited cell remains in that state until another electric signal emanating from cams 36 gives the command to transfer the information stored in the cell to a conventional electrically powered adding machine 38. Simultaneously, the cams further signal the adding machine to process this information.

A comparing circuit 40 (also shown in FIGS. 13 and 14) is responsive to electric signals from the read-feed mechanism transferred to it through plug board 28 and signals the adding machine to subtotal or total upon the occurrence of certain, predetermined events as more fully described below. The comparing circuit is also coupled with clutch 24 to disengage motor 22 from the remainder of the automatic adding machine wherever the comparing circuit signals the adding machine to total or subtotal.

Figure 1:
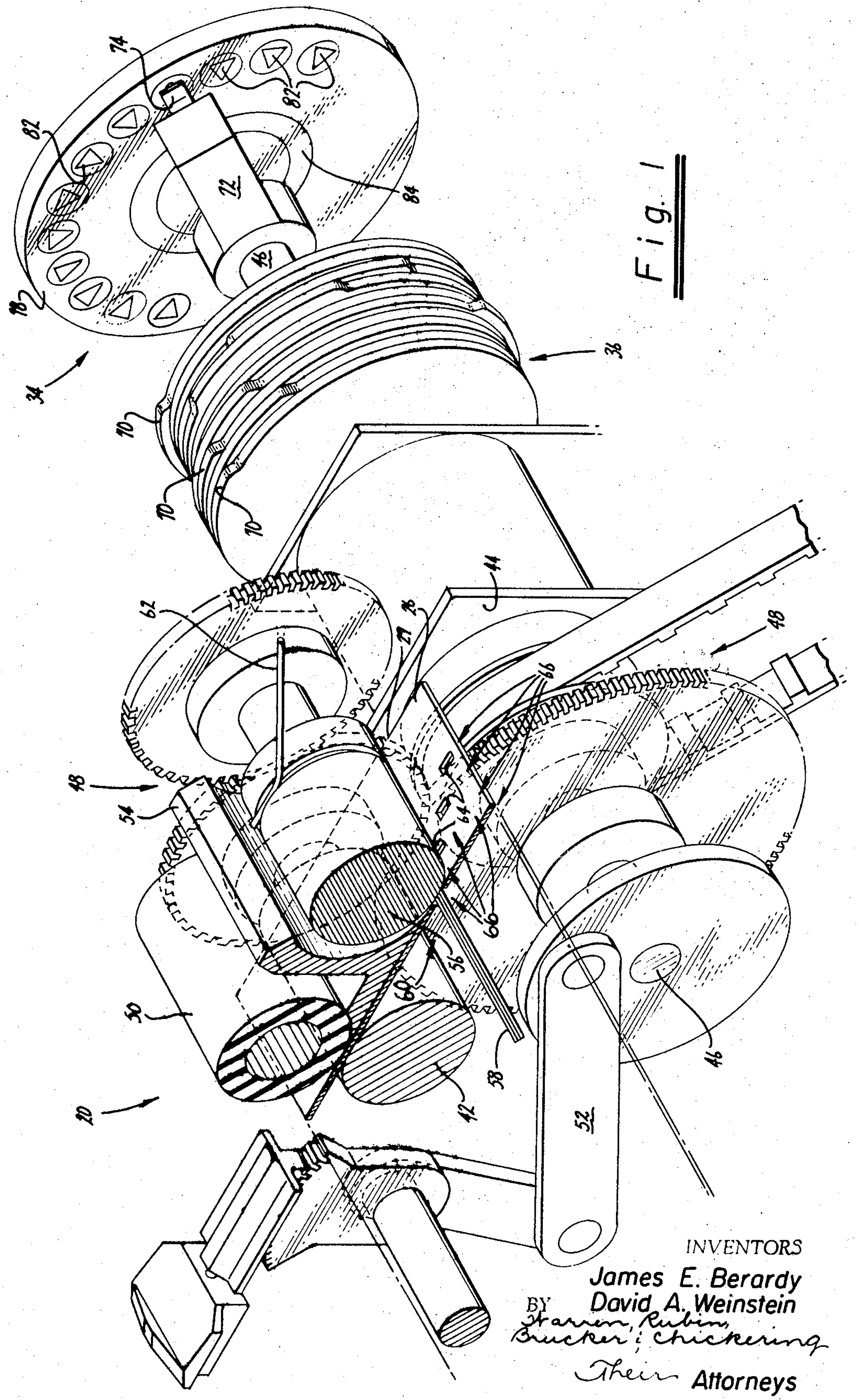
FIG. 1 is a fragmentary, perspective view, partially in section, of a read-feed mechanism, its drive shaft and circuit energizing means used in an automatic adding machine constructed according to the present invention.

Referring to FIG. 1, those portions of the read-feed mechanism 20 which are essential to the understanding of the present invention are described. For a more detailed description thereof the reader is referred to the above-identified copending patent application.

Serially arranged drive rollers 42 (only one of which is shown) are journaled in a frame 44 and are driven off a common drive shaft 46 of the read-feed mechanism through a suitable gear train 48. Also journaled in the frame are resilient rollers 50 (again only one is shown) opposite each feed roller which are rotated by the feed rollers through providing a closely controlled, slight interference therebetween. A crank operated card feed mechanism 52 forwards cards 26 from a hopper (not shown) to the feed rollers. The movement of the cards through the feed rollers is controlled by guide members 54.

A gear driven read roller 56 is constructed of an electrically conductive material and, together with a plurality of brushes 58 defines a read station 60. A second read station 60a (shown in FIG. 12) may be provided for purposes to be more fully set forth below, and is spaced from the shown read station in the direction of travel of card 26. A conductor 62 subjects the read roller to an electric potential each time a card 26 passes it and operates a card switch (not shown). The brushes 58 are biased toward roller 56 and against the card and if a punched hole 64 in the card, which signifies certain data, passes between the brushes and the read roller the one brush aligned with the punched hole can contact the read roller through the hole. It becomes momentarily electrically energized until the hole has passed from between the brushes and the roller. The brushes are arranged so that there is a brush aligned with each column 66 of holes in the cards. When a row 68 of the punched holes passes the read station that brush which is aligned with the particular column in which the punched hole is located is energized. An electric output signal is thus obtained from the read-feed mechanism 20, in a conventional manner. Referring REferring to the right-hand side of FIG. 1, there are mounted on the projecting portion of shaft 46 a plurality of laterally spaced switch actuating cams 36; each including a radially outward projecting lobe 70. Also mounted on the projecting end of the drive shaft is a rotor 72 having a brush 74 secured thereto. Thus, the cams and the rotor are mechanically interlocked with the drive shaft and, therefore, with the feed and read rollers of the read-feed mechanism so that they rotate in precise synchronism with each other.

Figures 4, 5:
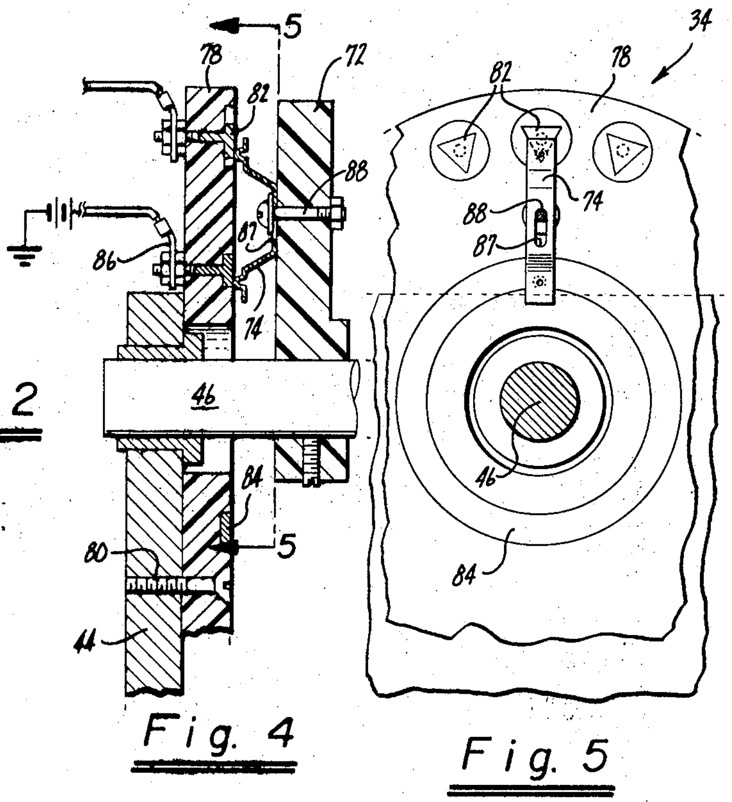
FIG. 4 is an elevational view, in section, taken on line 4–4 of FIG. 3.
FIG. 5 is an elevational view, in section, taken on line 5–5 of FIG. 4.

Referring to FIGS. 1 through 5, electric switches 76 for closing electric control circuits as more fully described hereinafter are mounted on frame 44 of the read and feed mechanism so that each switch is operated once during a revolution of the drive shaft. The time of operation relative the angular position of the drive shaft is controlled by the position of the cam lobes. A disc 78 is concentrically mounted about the drive shaft and secured to the frame by threaded bolts 80. Row switch 34 comprises a plurality of angularly spaced-apart electric contacts 82 mounted in the disc and arranged concentrically relative to the axis of the drive shaft. The number of contacts 82 equals the number of card rows 68 which are read by the read-feed mechanism 20. The switch 34 further includes a continuous, electrically conductive slip ring 84 which is mounted in disc 78 radially inwardly of contacts 82 and is connected to a DC voltage source 86. The rotor 72 has a brush 74 secured thereto and is of a generally U-shaped configuration, as best seen in FIG. 4. Brush 74 sequentially couples the slip ring with each electric contact during each revolution of the rotor on the drive shaft.

The contacts 82 have a triangular configuration so that their peripheral sides are nonparallel in the direction of movement of the rotor. The center portion of the brush is slotted in a radial direction, relative to the drive shaft, to permit the brush to be moved radially inward or outward relative to the drive shaft. By moving the conductor in a radial direction, the contact time per revolution between the rotor and each electric contact 82 of disc 78 can be varied. A mounting bolt 88 projects through slot 87 and adjustably secures the brush to the rotor.

Figure 6:
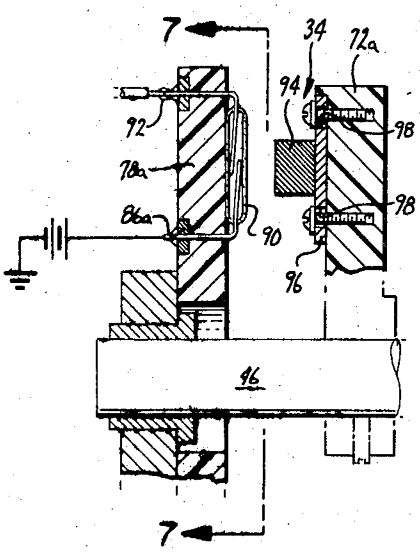
FIG. 6 is an elevational view, in section, similar to FIG. 5 but showing another embodiment.
Figure 7:
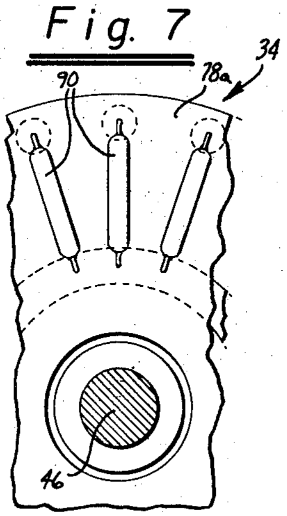
FIG. 7 is an elevational view, in section, similar to FIG. 5 and is taken on line 7–7 of FIG. 6.

Referring to FIGS. 6 and 7, an alternative embodiment for electrically coupling a voltage source to a plurality of contact terminals 92 includes a plurality of angularly disposed glass encapsulated reed switches 90, of a slip ring and brush. The reed switches are of a conventional construction and as such include magnetically responsive terminals which are normally open and thereby interrupt the electrical continuity between the voltage source and the electric contact terminal 92 on disc 78*a*. Rotor 72*a* carries a magnet 94 on a mounting plate 96 which includes slots 98 to permit radial adjustment of the magnet. When the rotor moves relative to the disc, magnetic forces sequentially close the terminals of the reed switches. Depending upon the radial position of the magnet, the length of time during each revolution of rotor 72*a* which the terminals of a reed switch are closed can be prolonged or shortened.

Referring again to FIG. 1, rotor 72 and disc 78 are mounted to electrically connect a contact 82 with the voltage source 86 during each time interval a row 68 of punched holes 64 in a card 26 is at read station 60. The time interval during which the contact is electrically energized by brush 74 is adjusted so that it corresponds to the time interval during which a brush 58 can project through the punched hole in the card and contact the read roller. Thus, a pair of electrical signals can be emitted. The first signal emanates at read roller 56 and energizes a brush 58 when a punched hole in a card appears adjacent the roller. The second signal emanates from source 86 through the appropriate contact and identifies the row 68 of the sensed punched hole. To permit full identification of all punched holes in the cards, disc 78 must have a number of contacts 82 at least equal to the number of rows 68 of punched holes in the cards.

The signals from the read roller and row switch furnish all the information necessary to identify the data on a card. The matrix 30 operates to receive the information and make it acceptable to the adding machine so that the data can be properly processed.

The wiring and function of matrix 30 is described with reference to FIG. 10. As briefly referred to earlier, the matrix comprises a plurality of cells 32 which are arranged in columns 100 and rows 102, the number of columns and rows corresponding to the number of columns 66 and rows 68 read off card 26. In a preferred embodiment of the invention, the number of columns and rows read off the punched card is 10 each so that there are a total of 100 possible combinations and, therefore, a total of 100 cells 32. Each cell of the matrix is characterized by an independent electrical circuit comprising a silicon controlled rectifier (SCR) or thyristor 104, an isolating diode 106, an inductor coil 108 and a pair of biasing resistors 110 and 112. Each row 102 has a common conductor 114 to which an end of coil 108 is joined. A common energizing source 116 of a 5-volt DC potential is joined with all conductors 114 when switch 76*e* closes.

The circuit of each cell is also connected to a ground 118 maintained at 0 volts through the cathode of the SCR 104 whereby a series of circuits is formed between the energizing source 116, conductor 114, and ground 118 by coil 108 and the SCR. In actuality the ground is returned to a main energizing source and thus there is in fact a second set of common lines which connect to each of the circuits for this purpose. The gate terminal 104*a* of the SCR is connected through the limiting resistor 112 to the anode of diode 106. The cathode of the diode is electrically coupled to a row input conductor 120, one such conductor being provided for each row 102. The anode of diode 106 is also electrically coupled through a biasing resistor 110 to a column or brush input conductor 122, one such conductor being provided for each column 100 of the matrix.

A negative 12-volt DC bias source 124 energizes a bias conductor 126 which in turn is electrically coupled to each of the row input conductors 120 through a resistor 128 whereby, unless otherwise acted upon, each of the row input conductors is maintained at −12 volts DC. Source 124 is also electrically coupled to brush input conductors 122 through biasing resistors 130. The brush input conductors are, therefore, also maintained at −12 volts DC in the absence of other signals.

Each brush input conductor 122 is further electrically coupled at 132 to a different brush 58 of the read-feed mechanism 20 (shown in FIG. 1) via the program in panel or plug board 28. Similarly, each row input conductor 120 is electrically coupled at 134 to a different electrical contact 82 (or 92) of disc 78 (or 78*a*).

Assuming no signals in the matrix and the only voltages being those from the above-identified sources, coil 108 is subjected to the 5-volt source 116 but cannot pass current because of the bias on gate 104*a* established by the −12 volts on conductor 122. Accordingly, no current flow takes place. Diode 106 establishes an AND gate between conductors 120 and 122 whereby if either of the conductors is at its −12 volts bias it will prevent a positive voltage from appearing at gate 104*a* even though the other conductor may have been elevated to a positive voltage. Such a positive voltage can be supplied by either the brushes 58 or the associated contact 82 set forth below.

During operation of the read-feed mechanism 20, the row input conductors 120 are sequentially energized by the DC voltage source 86 (25 volts DC) as rotor 72 rotates relative to disc 78. This 25-volt potential only operates a gate 104a of a cell 32 if the associated brush input conductor 122 is simultaneously energized to a positive voltage. Such an energization can only take place if a brush 58 is energized by contacting read roller 56 through a punched hole 64 in card 26. Depending on the relative position of the punched hole, or the column 66 in which the punched hole is located, the corresponding brush input conductor 122 will be energized by the 25-volt DC supplied to the read roller by conductor 62. Thus, a cell 32 of the matrix is identified by the simultaneous presence of a potential on both a particular row input conductor 120 and brush input conductor 122. The identified cell corresponds to the row and column in which the punched hole 64 is positioned in the card.

Assuming, by way of example, that the number 6 row input conductor 120 is energized to 25 volts at the same time as the brush input conductor 122 is energized to 25 volts due to the presence of a punched hole in the fifth column of the card, the following occurs. The positive voltage on both conductors, operates to elevate the voltage at the gate terminal 104a of the SCR to a positive voltage which causes the latter to trigger and thereby allow a current to flow from source 116 through coil 108 and to ground 118. At this point the SCR's act as switches for the solenoid coils 108. It is to be kept in mind that source 116 operates at 5 volts DC.

Referring now briefly to FIG. 8, adding machine 38 includes a plurality of digit keys 136 which are arranged in rows 138 and columns 140. The number of rows and columns corresponds to the number of rows 68 and columns 66, respectively, of punched holes 64 in card 26 which may contain data to be accumulated and, in our example, is 10 each. The digit keys set the accumulation mechanism (not shown) of the adding machine and are operated by electric solenoids. Since each digit key includes one solenoid, there are a total of 100. Other adding machines which employ only digit keys for the numbers one through 10 and in which zero occurs automatically in the absence of a signal for a particular number in a column can, of course, be employed. In that instance, the adding machine illustrated in FIG. 8 would only have 90 digit keys. Accordingly, matrix 30 (shown in FIG. 10) would only have 90 cells 32 defined by the 10 banks and nine rows (not shown).

The circuits which form matrix 30 employ the actuating coils of the digit key solenoids as the inductors 108. The voltage source which drives a cell after it has received a signal from both the row switch and card read roller is selected to be less than the voltage required to actuate the solenoid. Once a cell is triggered, however, current continues to flow and maintains the SCR's condition. Thus, the matrix operates to memorize the data on a card and simultaneously condition the proper solenoids of the adding machine for subsequent operation.

It should be noted that once the SCR 104 has been triggered, there will be current flow through the gate terminal 104a whereby the associated input conductor 120 cannot return to its −12 volts condition. Instead, it will return to some other minus voltage. Because it is possible that all of the circuits in a given row can be turned on during the processing of a single card, which has a cumulative effect of drawing currents from all of the gate terminals of the SCRs in the row, the resistors 128 are carefully selected to assure that even under these conditions, the conductor is maintained at some sufficiently negative voltage to prevent any of the other circuits in the row associated with that conductor from being incorrectly biased and triggered.

Figure 2:
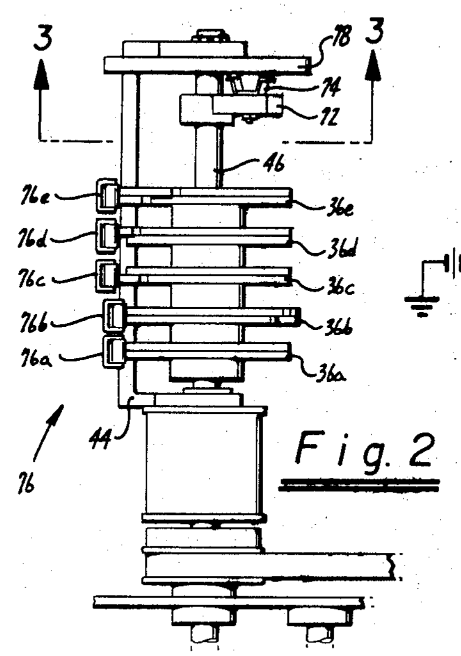
FIG. 2 is a fragmentary side elevational view of the drive shaft shown in FIG. 1.
Figure 3:
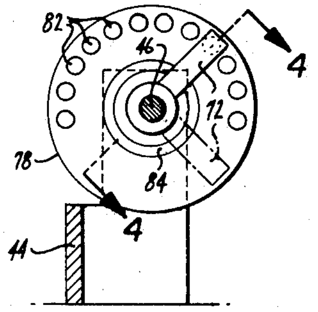
FIG. 3 is an elevational view, in section, taken on line 3–3 of FIG. 2.
Figure 9:
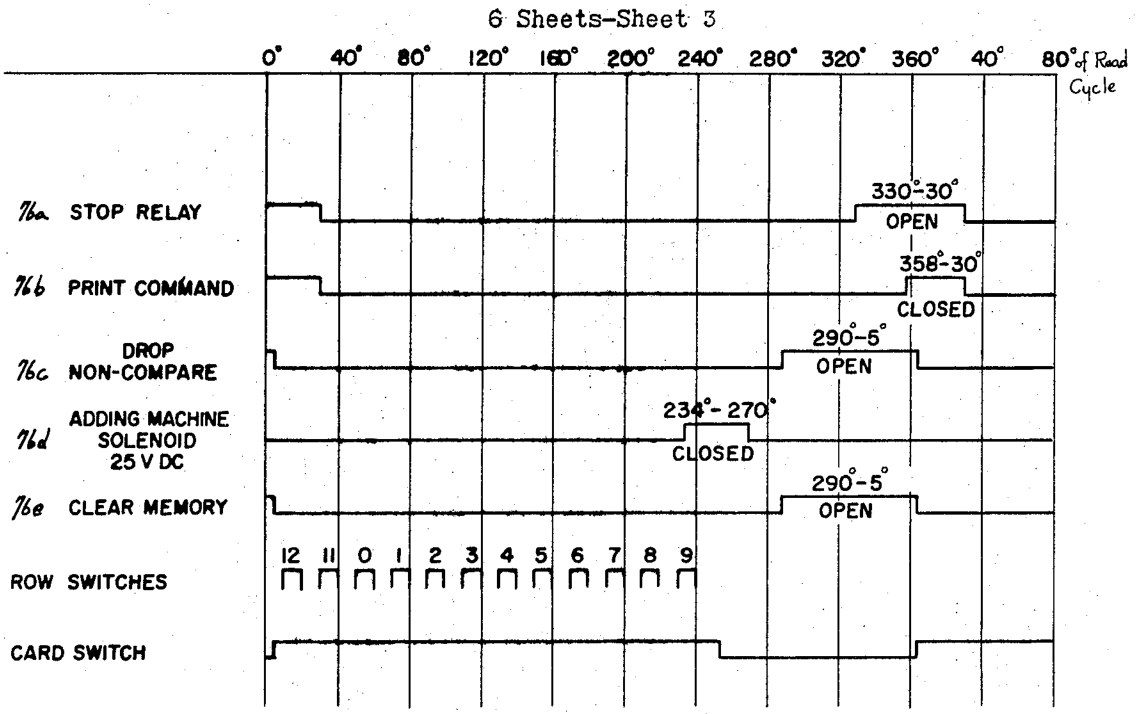
FIG. 9 is a timing chart of the operation of the circuit actuating devices mounted on the drive shaft as they take place during one revolution of the drive shaft.
Figure 11:
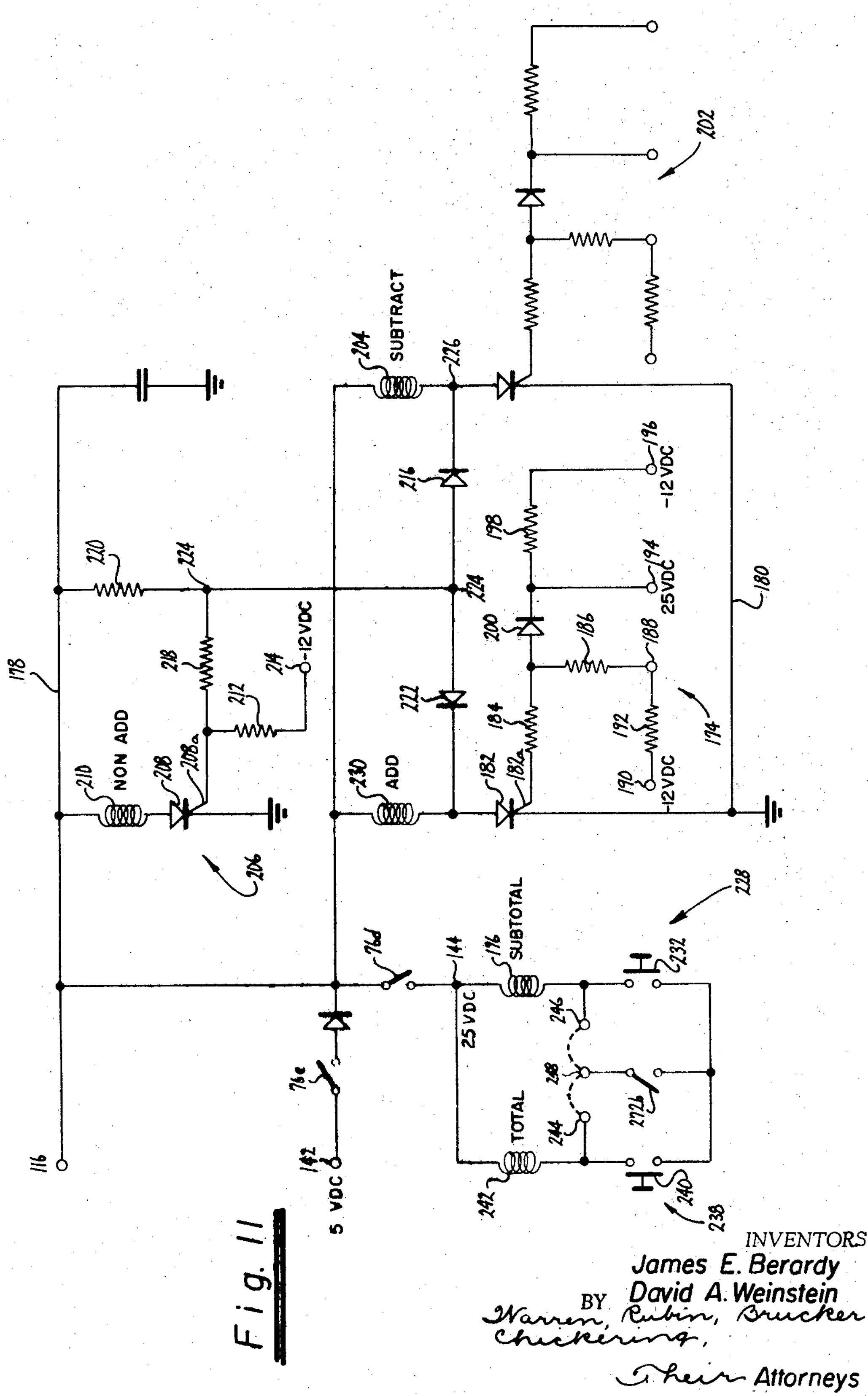
FIG. 11 is a schematic wiring diagram of circuits employed in the adding machine.

Referring to FIGS. 2, 10 and 11, a 5-volt DC source 142 and a 25-volt DC source 144 (shown in FIG. 11) each are coupled in a normally open circuit with source 116 (shown in FIGS. 10 and 11) of matrix 30. The 5-volt source is isolated from source 116 through the normally open cam-actuated switch 76e which closes at or just after commencement of a read cycle. Referring momentarily to FIG. 9 where a read cycle is illustrated in degrees of rotation of drive shaft 46, switch 76e closes at 5° and remains closed to 290°. At 234° cam 36d closes switch 76d for 36° from 234° to 270°. Returning to FIGS. 2, 10 and 11, switch 76d couples the 25-volt DC source 144 with source 116 of matrix 30. A diode 146 isolates switch 76d from the 5-volt source 142.

In operation, switch 76e is maintained closed as long as the matrix receives signals from the read-feed mechanism 20 and the row switch 34. During this time, it will be recalled, information is memorized in the matrix by maintaining the triggered SCR's 104 in that condition with 5-volt DC potential from source 116. Thus, the SCR's of the matrix act simultaneously as a switch and a memory cell. Closure of switch 76d supplies a 25-volt source to all conductors 114 and, therefore, coils 108. The ensuing current is sufficient to energize those solenoids which have their coils disposed in a cell circuit of the matrix which has been turned on during the reading of the card. Switch 76d is maintained closed for a sufficient period of time to operate the solenoids. Generally, about 25 milliseconds are the minimum time required to assure positive actuation of the solenoids. Thereafter, switch 76d is again opened. At about 290° (see FIG. 9), switch 76e is opened so that source 116 is not subjected to any potential to allow all cell circuits to return to their normal, open position and which resets all previously triggered SCR's 104 to their open state. The memory of the matrix is thereby cleared.

Figure 12:
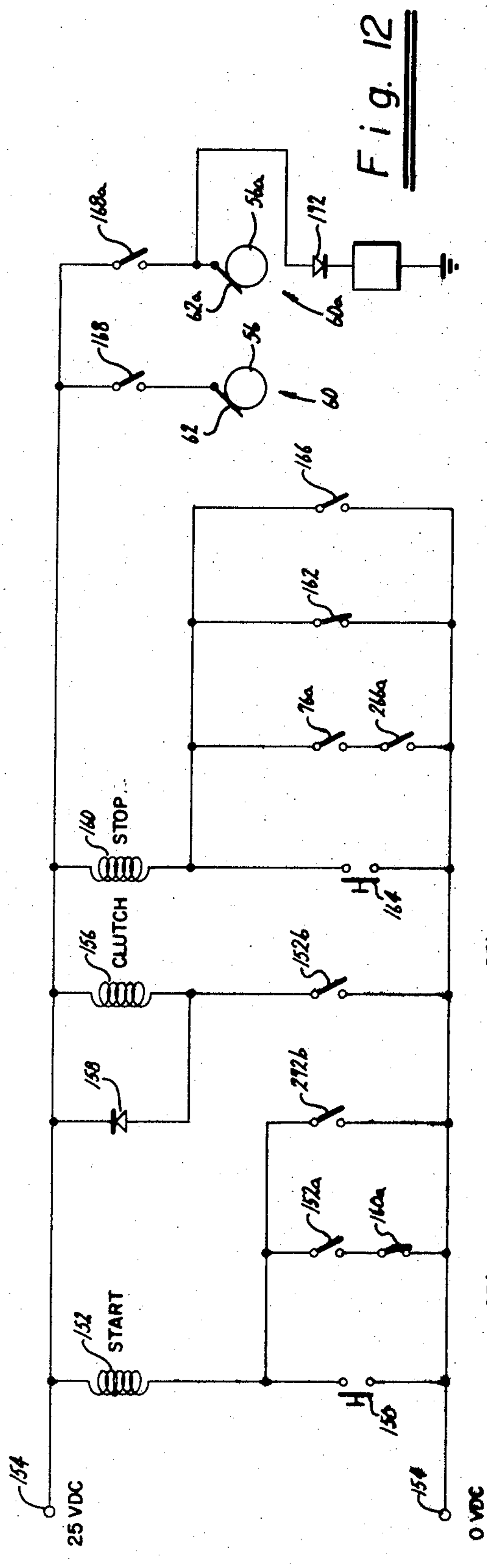
FIG. 12 is a schematic wiring diagram of other circuits employed in the adding machine.

Referring now to FIG. 12, electric circuitry 148 for operating the automatic adding machine 18 is provided as follows. A pushbutton 150 is coupled in series with a start relay having a start relay coil 152, both of which are disposed between a 25-volt DC source 154. Depression of the pushbutton establishes a circuit through the start relay coil which operates to close a normally open relay switch 152a. The coil relay is in a latching circuit so that release of the pushbutton does not interrupt the flow of current since a new path is established by the closing of switch 152a. Energization of relay coil 152 also operates to close a normally open relay switch 152b which is in series with a clutch solenoid coil 156 whereby the latter is energized and causes clutch 24 to engage drive shaft 46 for operating the read-feed mechanism 20, cams 36 and cam actuated switches 76, and row switch 34. A diode 158 is placed across coil 156 to act as a conventional spark suppressor. Operation of the automatic adding machine now commences and are read by the read-feed mechanism and memorized in matrix 36 as described above.

A stop relay coil 160 is placed across the voltage source 154 in series with several switches, one of which is a normally closed hopper switch 162. The hopper switch is positioned adjacent the card hopper of the read-feed mechanism and is opened by the presence of one or more cards in the hopper so that current is prevented from passing through the stop relay coil while the switch is open. Other switches include a normally open stop pushbutton 164, a normally open stacker switch 166, normally open noncompare relay contacts 266a and a cam switch 76a which is closed during a portion of each cycle of the read-feed mechanism. As long as contacts 266a remain open the closing of switch 76a does not energize coil 160.

Energization of relay coil 160 opens the normally closed relay contacts 160a which are in series with start relay coil 152 so that current is prevented from further flowing through the start coil. Start relay contacts 152a are thereby returned to their normally open position. Similarly, relay contacts 152b open, thereby deenergizing clutch coil 156 and decoupling clutch 24 from drive shaft 46. Although motor 22 continues to run, the read-feed mechanism ceases to operate.

Removal of the last card from the hopper closes switch 162 whereby stop coil 160 is energized and start relay coil 152 is deenergized as described in the preceding paragraph.

If the read-feed mechanism 20 is provided with two read stations 60 and 60a a pair of cards remain to be processed, after hopper switch 162, for example, closes, yet clutch 24 has been disengaged from drive shaft 46. To process these remaining two cards, or one if the feed mechanism is provided with only one read station, start pushbutton 150 is depressed to cause the read-feed mechanism to go through another cycle. If two cards are disposed in the read-feed mechanism, this operation is repeated a second time.

During the processing of a stack of cards, the operation of the read-feed mechanism is stopped by manually depressing stop pushbutton 164 to energize stop relay coil 160. Operation of the read-feed mechanism thereby ceases as described above.

Stacker switch 166 is provided to prevent malfunctioning of the automatic adding machine 18 from an overloading of the stacker (not shown) with processed cards. Consequently, if a predetermined number of cards are disposed in the stacker, stacker switch 166 closes to energize stop relay coil 160. The read-feed mechanism is again decoupled from the motor.

Referring now briefly to the right-hand side of FIG. 12, a pair of read stations 60 and 60*a* are schematically illustrated. Read rollers 56 and 56*a* are connected with the 25-volt DC source 154 by the closing of a pair of normally open card switches 168 and 168*a*. The card switches are closed by the passing of cards 26 (not shown in FIG. 12) past the respective read stations, as more fully described in the above-referred copending patent application, whereby conductors 62 and 62*a*, and thereby read roller 56 and 56*a*, are subjected to the 25-volt potential. This potential may then energize one of the brushes 58 as described above.

To maintain count of the number of cards processed by the automatic adding machine an electrically actuated counter 170 is preferably provided and electrically coupled with conductor 62*a* so that it receives an electric impulse each time a card closes switch 168*a*. An isolating diode 172 prevents the −12-volt biasing voltages from source 124 (shown in FIG. 10) from being short-circuited to ground through the counter 170 since a complete circuit exists through the brush input conductors 122, the brushes 58, rollers 56, conductors 62 and counter 170.

Adding machine 38 operates in a plurality of modes. Preferably, it includes an add, a subtract, a total, a subtotal, a nonadd and a printout mode wherein the printout mode may be associated with each one of the other modes or only with some of them. Accordingly, electric circuitry is provided for signalling the adding machine in which mode to operate.

The operating mode of the adding machine may be dependent upon the information stored on the card being processed by the read-feed mechanism 20, or it may be controlled independently and automatically without regard to the information stored on the card. In the former case, means must be provided for pickup of this information from the card and for transforming it into suitable signals to give the appropriate command to the adding machine. The information is stored in one of the columns or rows 66 or 68 of the card in the form of a punched hole 64. Generally, such information is contained in a punched-out hole in one of the first two rows available on the card due to the configuration and arrangement of data processing equipment on which the cards are originally encoded. These rows reach the read stations 60 of the read and feed mechanism first. Thereafter, rows containing information for actual entry into the adding machine are read. Thus, since the signal for actuating the adding machine in the selected mode must be introduced into it after digit keys 136 have been set through matrix 30, the information must be stored or memorized during the time interval which other data is read and stored in the matrix and then used to set the adding machine. Appropriate command circuitry for activating adding machine 38 is, therefore, provided.

Referring to FIG. 11, an add command circuit 174 provides for operation of adding machine 38 either in response to a punched hole 64 in a row 68, say the number 12 row, of the card or for automatic operation by proper wiring through plug board 28. In the latter instance, the data on every card passing read station 60 is automatically accumulated and added without regard to the presence or absence of information on the card in the number 12 row. An add solenoid has an add coil 230 electrically coupled with a conductor 178 joined to the 5-volt DC source 142 through switch 76*e* and with a return conductor 180 at 0 volts. Disposed between coil 230 and the return line 180 is an SCR 182 with its gate terminal 182*a* electrically joined to either the automatic add command or the row add command. Thus, gate terminal 182*a* is electrically joined through a resistor 184 and a resistor 186 to a plug board terminal 188 which is in turn connected to a negative 12-volt DC source 190 through a resistor 192. The plug board connector 188 is wired to a positive 25-volt DC source and connected therewith by the presence of a card in the read station when automatic add operation is desired. This assures that add coil 230 is energized each time a card passes through the station. In the alternative, if operation of the add coil is determined by the presence of a punched hole 64 in the 12th row of the card being processed, terminal 188 is wired to the column in which the punched hole signalling the add command is expected to appear.

When a hole appears in the 12th row and the selected column of the card being read, 25-volt pulses are applied to terminal 188 from a brush 58 and read roller 56 (see FIG. 12) and to a terminal 194 from row switch 34 which operate to override a negative 12-volt source 196 connected to the gate terminal 182*a* of SCR 182 through a resistor 198, a diode 200 and resistor 184. The presence of the positive 25 volts at terminal 188 operates to trigger SCR 182 whereby add coil 230 draws current which passes through the SCR and maintains it in its "on" condition even after the 25-volt pulse on terminal 188 ceases. Thus, it memorizes the fact that it has been triggered.

A subtract command circuit 202, shown in the right-hand portion of FIG. 11, is substantially identical to add command circuit 174 described in the preceding paragraph except that it operates through a subtract solenoid having a subtract solenoid coil 204. The subtract circuit provides for operation in response to the presence of the punched hole 64 in another row 68, say row 11, of the card. It, too, has a memory built-in.

A nonadd command circuit 206 is provided to select the operating mode of the adding machine 38 when neither SCR of the add or subtract circuit is triggered. When the adding machine operates in its nonadd mode, data supplied to it (i.e. to certain digit keys 136 the solenoids of which have been energized through matrix 30) is not accumulated in the adding machine. Instead, the data is printed out only. When a new set of data, say a new stack of cards 26 containing information which is somehow different from that of the cards in a previous set, is to be processed, a new heading on the printout sheet is provided.

An SCR 208 is coupled with a nonadd solenoid having a nonadd coil 210 connected to the biasing conductor 178 from which it draws draws current when the SCR is triggered. A gate terminal 208*a* of the nonadd SCR is joined through a resistor 212 to a negative 12-volt source 214. In the absence of further biasing, this maintains the SCR in its off condition and coil 210 cannot draw current. A diode 216 has its anode connected through a resistor 218 to gate terminal 208*a* and through a second resistor 220 to biasing line 178. A second diode 222 has its anode connected in series with resistor 220 and is disposed between the anode of diode 216 and resistor 218. its cathode is coupled with the anode of add coil SCR 182. It biases the SCR 208 to its triggered condition when neither add SCR 182 not the subtract SCR of circuit 202 are triggered.

This operates as follows: when SCR 182 is triggered mode 224, which is common to resistors 218 and 220 as well as to diode 216 and 222, is at a slightly positive voltage due only to the drop across diode 222 and SCR 182. Under these conditions, the −12-volt source 214 maintains the SCR 208 in its off condition. Similarly, if mode 226 which joins the subtract SCR and diode 216 is at a slightly positive voltage due to a conductive subtract SCR the −12-volt source 84 once again prevents diode 208 from triggering. It is to be noted that the above-described operation is accomplished by recognition of the fact that even though the biasing conductor 178 is maintained at only 5 volts or 25 volts during this phase of operation the divider which is established by resistors 212 and 218 prevents gate terminal 208a from going positive despite the positive drop that exists across resistor 220 because mode 224 never goes positive above 2 volts.

If neither the add SCR 182 nor the subtract SCR are triggered, which only occurs when neither is in an automatic mode and neither receives an electric pulse from the respective brush 58 with which it is associated, then the drop across resistors 218 and 220 is such that it drives gate terminal 208a to a positive voltage when conductor 178 goes to 25 volts. Conductor 178 goes to 25 volts DC upon the closure of switch 76d by cam 36d.

The nonadd memory system is somewhat different from that of the add and subtract memory systems. SCR 208 operates replaced as a switch rather than as a temporary memory and fires only upon the application of 25 volts and not during the time when conductor 178 is at 5 volts. There is, however, a memory associated with SCR 208 because once it fires it remains in its triggered condition even though the biasing conditions for triggering it may have ceased.

A subtotal command circuit 228 is provided to trigger a subtotal solenoid of the adding machine having a subtotal solenoid coil 176. The subtotal solenoid is manually energized by depressing a pushbutton switch 232 in series with coil 176. The subtotal coil can also be wired for automatic energization as set forth below.

Also provided is a manually operated command circuit 238 for signaling the adding machine to total. A manually operated pushbutton switch 240 in series with a "total" solenoid coil 242 is disposed between the 25-volt source 144 and return line 180. Upon operation of the total pushbutton, current of a sufficient magnitude to actuate the "total" solenoid flows through the total coil 242. This operates the total cycling of the adding machine.

Both the subtotal solenoid and the total solenoid can be operated in conjunction with a print command associated with the comparing operation of the automatic adding machine 18 discussed below. The print command includes a relay (not shown in FIG. 11) having contacts 272b which can be associated with the total coil 242 or the subtotal 176 coil through plug board terminals 244 and 246, respectively, and a common terminal 248. When the print command relay is energized, print command relay contacts 272b associated with subtotal coil 176 or total coil 242 are closed. Whichever coil is associated with the print command through the plug board thereby operates with the print command relay and the printout mode of adding machine 38.

It is to be noted that the operation of adding machine 38 is not a continuous cycling operation but instead it comes to rest and waits for a command from any one of solenoid coils 176, 204, 210, 230 or 242 to initiate the particular cycle. As briefly referred to earlier, the adding machine cycle is slightly shorter than the read-feed mechanism 20 cycle and the former must, therefore, come to a complete stop before it receives an operating command. There is thus play to allow for a possible asynchronism since it is corrected after each cycle. If this difference in cycle time were not built-in, any asynchronism that may exist could accumulate until signals from the read-feed mechanism are not entered in the adding machine 38 and information on a card becomes lost.

Figure 14:
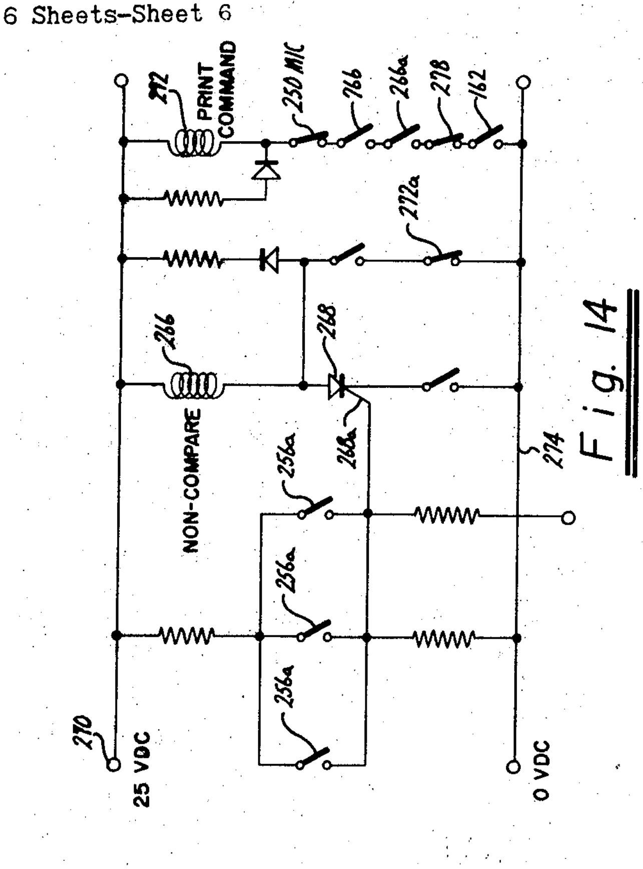
FIG. 14 is a schematic wiring diagram of other circuits, including a portion of the compare circuit, employed by the adding machine.

For this reason and with reference to FIG. 14, a "machine in cycle" (MIC) switch 250 is actuated for each cycle of the adding machine. The MIC switch is actuated by the cycling adding machine. It is normally closed and is open during the time interval the adding machine cycles. The MIC switch prevents the actuation of the adding machine to commence a printout cycle due to a print command and/or a noncompare situation.

Figure 13:
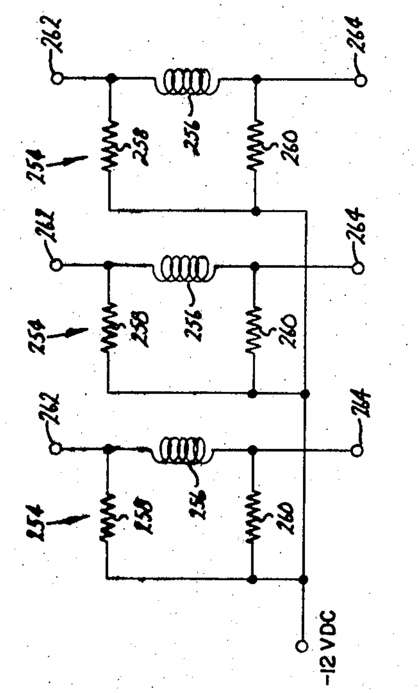
FIG. 13 is a schematic wiring diagram of a portion of a "-compare" circuit employed by the adding machine.

Referring to FIGS. 13 and 14, the automatic adding machine may be provided with a compare system to group cards 26 read by the read-feed mechanism as belonging to a common, larger set of data (compare situation) or as belong to different such sets (noncompare situation). A noncompare situation can occur as follows: the automatic adding machine 18 has two serially arranged read stations 60 and 60a (see FIG. 12) and in one of the corresponding rows 68 of each card, there being a different card at each read station, a pair of nonmatching punched holes 64 are present. This signals that the two cards belong to different from each other, larger sets of data, or different stacks of cards, which data should not be accumulated together or, at least, which requires a subtotal of the larger set that had just been processed. It is, therefore, necessary to provide a compare circuit 252 which constantly compares this information on each two cards present at the read stations.

There are three compare subcircuits 254 each of which includes a relay having a relay coil 256 and a pair of resistors 258 and 260. Each subcircuit includes a pair of terminals 262 and 264 which are respectively electrically joined to brushes 58 (not shown in FIGS. 13 and 14) at the read stations 60 and 60a. As long as the brushes coupled with the terminals of the subcircuits see cards belonging to the same larger set, both terminals are subjected to identical potential and no current flows through coils 256. If a card appears at read station 60 which belongs to a different set of cards from that to which the card at read station 60a belongs, only one of the terminals is energized while the other remains at minus 12 volts. Current, therefore, passes through the particular relay coil 256, energizes it and causes one of the normally open relay switches 256a (shown in FIG. 14) to close.

The number of subcircuits equals the number of card columns 68 in which compare data may be stored. Three subcircuits are illustrated in FIG. 13 under the assumption that the punched hole in the cards being processed can occur in three card columns, say columns 11, 12 and 13. A greater of lesser number of subcircuits can, of course, be provided.

Upon occurrence of a noncompare situation, one or more of the parallel relay switches 256a closes which subjects gate 268a of an SCR 268 to a positive potential from a source 270 of 25 volts DC. This fires the SCR 268 and thus allows a relay coil 266 of a noncompare relay to be energized. Energization of the noncompare coil 266 closes switch 266a to energize stop relay coil 160 through cam switch 76a (shown in FIG. 12) and thus initiates a stop command which deenergizes the start relay coil 152 (also shown in FIG. 12). Thus, the noncompare detection of compare circuit 252 stops the read-feed mechanism.

It is virtually impossible to exactly position each pair of cards moving simultaneously past the read station of the read-feed mechanism. As a consequence momentary noncompare signals are emitted which can last for several milliseconds, depending on the inaccuracy of their relative positions even though the cards are of the same type, i.e. have like punched-out holes in one of their first rows. The prevent such momentary noncompare signals from triggering one of the noncompare relays 256, and thereby initiate an unintended noncompare situation, the relays are selected so that their response time is longer than the longest possible noncompare signal resulting from the inaccurate positioning of the cards. In this manner the relays are only triggered if a true noncompare situation occurs.

Upon the occurrence of a noncompare situation, it is also necessary to initiate a command to signal the adding machine 38 to operated it in its subtotal (and/or, if desired, in its total) cycle. After the read-feed mechanism 20 stops, it is still necessary for the adding machine to process the information of the card read last. Thus, the read-feed mechanism pauses while the last card is processed by the adding machine as is set forth below. The read-feed mechanism begins operation again simultaneous with the print command which initiates the subtotal cycle. It should be noted that the adding machine cycle is initiated when the read-feed mechanism is between 234° and 270° of its 360° cycle.

Referring to FIG. 14, the print command is initiated through a coil 272 of a print command relay which has one of its ends connected to the 25-volt source 270. Its other end is connected to a return line 274 through the MIC switch 250, a read-feed switch **76*b*, the normally open noncompare relay switch 266*a*, a normally closed stacker switch 278 and the normally open hopper switch 162 which, however, is closed whenever there are cards 26 present in the hopper (not shown) of the automatic adding machine 18. Thus, print command relay coil 272 is in a normally open circuit and not energized since the noncompare relay switch 266*a* is normally open. After the noncompare situation has occurred, the above-mentioned last card has been processed by adding machine 38, and the adding machine has terminated it cycle, MIC switch 250 closes. The read-feed switch 76*b* is closed because the earlier release of clutch 24 has assured that drive shaft 46 is stopped at its zero position. The normally open noncompare relay switch 266*a* is closed by virtue of the energization of relay coil 266, the stacker switch is closed since it only operates when there is an overload in the stacker, and the hopper switch, which is normally open, is closed by the presence of cards in the hopper. Thus, the closing of switch 250 when adding machine 38 comes to rest forms a complete circuit and causes current to flow through the print command coil 272. This initiates the subtotal cycle (or a total cycle if desired) and at the same time causes the read-feed mechanism 20 to be reenergized by a signal through the start relay coil 152 by contact 272*b***.

Energization of print command coil 272 opens the normally closed relay switch **272*a* which deenergizes the noncompare relay coil 266, resulting in the opening of the closed noncompare relay coil contact 266*a*. This deenergizes print command coil 272**. It is important to have the sequence of events so that the print command coil is energized for sufficiently long periods of time to insure that the solenoid actuated for the subtotal or total cycle of the adding machine is properly operated before the print command coil is dropped.

Turning now to the operation of the automatic adding machine 18, a stack of punched cards 26 is first inserted in the card hopper (not shown) of the machine. Although the cards may have any number of columns 66 and rows 68 of punched holes 64, in the presently preferred embodiment of this invention there are a total of 13 rows and 80 columns, 10 of which can be used for storing data to be accumulated in the adding machine. The first two rows or rows 11 and 12, include data which determines the operating mode of the adding machine 38. In the presently preferred embodiment of the automatic adding machine row 13 is not used. It is to be understood, however, that the cards can readily be replaced by punched tape, magnetic tape, etc. by merely changing the construction and arrangement of the read-feed mechanism 20. To facilitate the understanding of this invention, however, the construction of the automatic adding machine as well as its operation is only described with reference to punched cards.

Next, start pushbutton 150 is depressed to energize start relay coil 152 and couple drive shaft 46 of the read-feed mechanism with motor 22. Card feed mechanism 52 advances a card into engagement with feed rollers 42 which transport it to the first read station 60. For purposes of this disclosure, it is assumed that the automatic adding machine is provided with a pair of serially arranged read stations, as shown in FIG. 12, although it may, if desired, have only one. The first card is transported through the first read station without emitting any signals to the memory matrix 30. When the first card begins to leave the first read station, card feed mechanism 52, in exact synchronism with the movement of the first card, advances a second card toward the feed rollers 42. The two cards now move at the same speed and at like position relative to the first and second read stations, respectively. Upon arriving at the respective read stations, the cards energize card switch 168 (shown in FIG. 12) which, via conductors 62, subjects the read rollers 66 to an electric potential. A brush 58 at each read station senses a punched out hole in one of rows 11 or 12 of each card. Assuming the holes to be identical, no noncompare situation occurs so that compare relay coil 256 are not energized. The operating mode of the machine for this cycle is set by the punched-out hole (if any) in row 11 or 12.

Referring briefly to FIGS. 9 and 10, drive shaft 46 is at 0° at the commencement of the read cycle. The rotation of the drive shaft causes cam **36*e* to close switch 76*e* at about 5° of the drive shaft rotation. This subjects source 116 and conductors 114 of matrix 30 to the earlier referred to 5-volts DC potential required for the memorization of data in the cells 32 of the matrix. As rotor 72, and more particularly brush 74, electrically connects slip ring 84 with the third electric contact 82 on disc 78, that is at about 60° of the drive shaft rotation, the first data containing card row 68 is at read station 60*a*. One of the brushes makes contacts with the read roller 56, provided a punched hole is present in that row, and subjects one of the brush input columns 100 of matrix 30 to a 25-volt potential. The first row 102 of the matrix is also subjected to 25 volts from the third electric contact 82 on disc 78, thereby selecting one of the cells 32 to be excited and memorize the fact that, later on, it is to energize the solenoid of its digit key 136 of adding machine 38. As the card progresses past the read station, all rows 102** of the matrix are energized and, if punched holes are present in the rows, the corresponding brush input column is energized to excite other cells.

Just before the last row of the card has passed the read station, say at 240°, switch **76*d* is closed (at about 234°) by cam 36*d*. A 25-volt DC potential is thereby applied to source 116 and coils 108 operate the digit key solenoids which correspond to excited cell 32** circuits.

While the first two rows of the card pass the read station, the output from one of the brushes is applied to either source 188 or the corresponding source in the subtract circuit 202 (all shown in FIG. 11) to energize one of the command solenoid coils 230, 204 or no-add coil 210 by lack of either output. Which of the brushes is energized depends on the data contained on the card. In the alternative, coil 230 can be automatically energized without going through a brush and one of the voltage sources referred in the preceding sentence by properly wiring plug board 28. In either instance, a mode selecting solenoid of adding machine 38 is excited but not energized and remains in that state until the read-feed mechanism has scanned all rows on the card and all of the electric contacts on disc 78 have been passed by rotor 72 and brush 74.

Again referring to FIG. 9, switch **76*d* is closed to subject the digit key solenoids and the mode key solenoids to 25 volts DC which operates the adding machine. Switch 76*d* opens after the solenoids are actuated. Then switch 76*e*, which supplies the matrix with the 5 volts potential is opened at about 290°. This serves to return all cell 32** circuits to their normal position, thereby clearing the memory from the matrix and readying it for receiving information from the next card arriving at the read station.

Closure of switch **76*d* energizes the digit solenoids 108 and the mode solenoids (204, 210, 230**) of the adding machine simultaneously. Since the digit solenoids must be set before the cycle of the adding machine (through the energization of the mode solenoids) commences, the solenoids are selected so that the response time of the former is faster than the response time of the latter.

The above-described operating cycles of the read-feed mechanism as well as of the adding machine repeat themselves each time a new card arrives at the read station. Should the card hopper run out of cards, hopper switch 162 closes, thereby energizing stop relay 160 which in turn deenergizes start relay 152 and decouples the motor from drive shaft 46. Similarly, should the card stacker become overloaded stacker switch 166 closes and decouples the motor from the drive shaft. Each time the adding machine has completed its cycle, it comes to a full stop. Synchronization of the read-feed mechanism and the adding machine is thereby assured.

If the two cards being simultaneously read at the read stations 60 and **60*a* trigger the compare circuit 252 due to their noncomparison, that is because they belong to different, larger sets of data or different stacks of cards, noncompare relay coil 266 is energized. Printout of the accumulated data takes place and the read-feed mechanism stops at the end of the cycle. The adding machine, whose cycle is initiated between 234° and 270° of the read-feed cycle, continues its normal accumulation. When the adding machine comes to rest, the MIC switch 25 closes. This closes the path to print command relay 272 which simultaneously gives the adding machine a print command (either total or subtotal) through contact 272*b* (FIG. 11) and also starts the read-feed mechanism by means of contact 272*b* (FIG. 12) placed in the circuit of start coil 152**. The adding machine is on its "extra" cycle of totaling or subtotaling, while the read-feed is on its next data gathering cycle. It should be pointed out that the read-feed mechanism is also a full cycle ahead of the adding machine at all times.

If there is a large number of cards to be processed, all of which require the same operating mode of adding machine 38, i.e. adding for example, then, instead of energizing the 25-volt DC sources 188 and 194 (shown in FIG. 11) each time a card passes a read station, the machine can be switched so that it automatically adds or subtracts the information stored on each card. Plug board 28 then is wired so that terminal 188 receives a positive 25-volt DC pulse each time a card passes the read station. This automatically triggers SCR 182 and excites add coil 230 for subsequent operation of the adding machine. If subtraction is desired, then electric circuit 202 is wired through the plug board and its plug board terminal so that the subtract solenoid coil 204 is energized each time a card passes the read station.

The automatic adding machine can be stopped at any time by depressing pushbutton 164 (shown in FIG. 12) to energize stop coil 160. This, as described above, deenergizes start coil 152 and decouples the motor from drive shaft 46. Similarly, subtotals can be obtained at any time by depressing subtotal switch 232 (shown in FIG. 11) to energize subtotal coil 176 without feeding any data to digit keys 136 of the adding machine. This initiates the subtotal mode of the adding machine. A total is obtained by manually operating switch 240 to energize total coil 242.

We claim:

1. Apparatus for accumulating data comprising:
a cyclically operating sequential data read mechanism,
a matrix operatively coupled with said mechanism for receiving and classifying read data,
means operatively coupled with said matrix for cyclically accumulating sets of data received from said matrix and having a cycle time shorter than the cycle time of said mechanism, the commencement of the cycles being interdependent,
said accumulating means including a plurality of data digit keys and said matrix including cells arranged in rows and columns and having an individual cell for each key, and second means mechanically interlocked with said read mechanism including a row switch having a plurality of circularly disposed contacts connectable with an electric potential by a brush, said contact and said brush being rotated relative to each other by a drive shaft of said read mechanism, for sequentially electrically coupling each row with said reach mechanism.

2. Apparatus according to claim 1, wherein an electrically actuated solenoid is associated with and operates each digit key and wherein each cell comprises independent circuit means including an energizing coil of the solenoid associated with the particular cell.

3. Apparatus according to claim 1, wherein said contacts and said brush are constructed to permit adjustment of the contact periods between them.

4. Apparatus according to claim 3, wherein said contacts have a periphery defined by nonparallel sides and wherein said brush is adjustable to permit movement of the contact point between the contacts and the brush in a radial direction relative to an axis about which said contacts and said brush rotate relative to each other.

5. Apparatus according to claim 3, wherein said contacts each comprise an encapsulated reed switch and said brush includes a magnet movable in a radial direction relative to an axis about which said read switch and said magnet rotate.

6. Apparatus according to claim 1, wherein said accumulating means comprise an adding machine having a plurality of operating modes includes add, subtract and printout modes, and a plurality of solenoid operated digit keys, and including electric command circuit means for signaling said adding machine in which mode to operate.

7. Apparatus according to claim 6, wherein said command circuit means include a memory system for storing commands to said adding machine while said read mechanism feeds data to said matrix so that the read mechanism can read said adding machine operating commands before reading said data.

8. Apparatus according to claim 7, wherein said electric command circuit means includes command subcircuit means for operating a subtotal mode of said adding machine independently of said feed mechanism.

9. Apparatus according to claim 7, including electric command circuit means responsive to said reach mechanism for signaling said adding machine to subtotal, and means coupled with said subtotal command circuit means for temporarily disabling said read mechanism so that said adding machine goes through an extra operating cycle.

10. Apparatus according to claim 9, wherein said subtotal command circuit means further signals the adding machine to operate in its printout mode.

11. Apparatus for accumulating data comprising:
a cyclically operating sequential data read mechanism including first and second read stations for comparing independent sets of data, and including electric circuit means operatively coupled with said stations for emitting signals when sets of data each belong to a different, larger set of data, electric command circuit means responsive to said last-mentioned signal for signalling an adding machine to operate in a nonaccumulating mode, and means for temporarily disabling said read mechanism so that said adding machine goes through an extra operating cycle,
a matrix operatively coupled with said mechanism for receiving and classifying read data, and
means operatively coupled with said matrix for cyclically accumulating sets of data received from said matrix which means comprise said adding machine having a plurality of operating modes including add, subtract and printout modes, and a plurality of solenoid operated digit keys and including electric command circuit means for signalling said adding machine in which mode to operate.

12. Apparatus according to claim 11, including a memory system in said command circuit means for storing operating command signals to said adding machine while said read mechanism feeds data to said matrix so that the read mechanism can read said operating command signals before reading said data.

13. Apparatus according to claim 1, wherein said matrix includes a memory system.

14. Apparatus according to claim 13, wherein said accumulating means includes a solenoid controlled data input system and wherein inductor coils of solenoids of said input system are part of electric circuit means of said memory system.

15. Apparatus according to claim 14, wherein said circuit means include solid state devices acting as switches for energizing said coils and as memory cells of said memory system.

16. Apparatus according to claim 1, wherein said read mechanism emits a pair of output signals for each data unit to be received by the matrix, the matrix includes a plurality of independent cells, and the convergence of said output signals on a cell identifies that cell as the one to transmit a data unit to the accumulating means.

17. Apparatus for accumulating data comprising:
a cyclically operating sequential data read mechanism,
a matrix operatively coupled with said mechanism for receiving and classifying read data, including means operatively coupled with said matrix for cyclically accumulating sets of data received from said matrix which means comprise an adding machine having a plurality of operating modes including add, subtract and printout modes, and a plurality of solenoid operated digit keys, and including command circuit means for signalling said adding machine in which mode to operate, and said matrix including an independent cell for each solenoid operated digit key and each cell having a built-in memory, each cell being defined by a normally open electric circuit including an energizing coil associated with a solenoid of a digit key and a thyristor, and wherein a first electric signal received from said read mechanism fires said thyristor and excites said coil insufficiently to operate the associated solenoid, and a second electric signal at the completion of the data readout of said read mechanism during an operating cycle causes sufficient excitation of said coil to operate said solenoid.

18. Apparatus for accumulating data comprising:

a cyclically operating sequential data read mechanism emitting a pair of output signals for each data unit to be received by a matrix, a matrix operatively coupled with said mechanism for receiving and classifying read data and including a plurality of independent cells arranged in rows and columns, means operatively coupled with said matrix for cyclically accumulating sets of data received from said matrix, and a first of said output signals sequentially applying a potential to said rows and a second one of said output signals applying a potential to one of said columns in response to the reading of a data unit by said read mechanism to select a cell from among the plurality of cells in the rows subjected to said first output signals and the convergence of said output signals on a cell identifying that cell as the one to transmit a data unit to the accumulating means.

19. Apparatus according to claim 18, wherein said matrix includes a memory system.

20. Apparatus for reading, accumulating and printing out data stored on media such as punched cards, punched tape, magnetic tape and the like, the apparatus comprising:

a read mechanism for progressively reading the stored data and sequentially emitting data responsive signals, feeding means for transporting said media to and past said reading mechanism, electric accumulating means operating in a plurality of modes and having solenoid actuated digit keys, a matrix including a memory system and having a cell for each said digit key, said matrix being operatively coupled with said read mechanism for receiving data read by said mechanism, storing it in said system and transferring said data to appropriate digit keys, command circuit means responsive to said read mechanism for selecting the operating mode of said accumulating means and actuating it in response to the completion of the reading of a set of data by said read mechanism, a second memory system in said command circuit means operatively coupled with said read mechanism for receiving and storing accumulating means command data from said mechanism so that data for said matrix can be read after said command data has been read, and said command circuit means including first and second command circuits for respectively operating said accumulating means in its add or subtract mode, and a third command circuit for operating the accumulating means in its printout mode only, said third command circuit being coupled with and responsive to nonoperation of said first and second command circuits.

21. Apparatus according to claim 20, wherein said read mechanism emits a pair of output signals for each data unit and sends said signals to said matrix, and the convergence of said output signals on a cell identifies that cell as the one to transmit a data unit to the accumulating means.

22. Apparatus according to claim 21, wherein said cells each include a thyristor subjected to a first, lower potential insufficient to fire said thyristor and to at least one of said output signals during each operating cycle of said read mechanism and said feed means, said output signals being of a short duration and a sufficiently high potential to fire said thyristor when said output signals converge on a particular cell, said first potential being of a sufficient magnitude to maintain said fired thyristor in a conductive condition, said conducting thyristor being subjected to a second potential of a sufficient magnitude to actuate said solenoid operated digit keys.

23. Apparatus according to claim 22, wherein an inductor of said solenoid operated key digits is serially coupled with each thyristor and wherein said first potential is of a magnitude insufficient to operate a solenoid of said digit keys.

24. Apparatus according to claim 21, wherein said output signals originate at different sources, one of said output signals originating at the source which comprises a plurality of contacts, a brush and a drive shaft of said feeding means for rotating said contacts and said brush relative to each other.

25. Apparatus according to claim 24, wherein a period of time during which said contacts and said brush are electrically coupled is adjustable.

26. Apparatus for reading, accumulating and printing out data stored on media such as punched cards, punched tape, magnetic tape, and the like, the apparatus comprising:

a read mechanism for progressively reading the stored data and sequentially emitting data responsive signals including first and second read stations, and including compare circuit means coupled with said stations for comparing data read simultaneously at the stations and for detecting and signalling the presence of two sets of data at said stations, each of which belongs to another, larger set of data, feeding means for transporting said media to and past said reading mechanism, electric accumulating means operating in a plurality of modes and having solenoid actuated digit keys, a matrix including a memory system and having a cell for each digit key, said matrix being operatively coupled with said read mechanism for receiving data read by said mechanism, storing it in said system and transferring said data to appropriate digit keys, and command circuit means responsive to said read mechanism for selecting the operating mode of said accumulating means and actuating it in response to the completion of the reading of a set of data by said read mechanism.

27. Apparatus according to claim 26, including electric command circuit means responsive to said compare circuit signaling for signaling said accumulating means to go through an extra operating cycle and for deactivating said feeding means for one cycle.

28. Apparatus according to claim 26, wherein said read mechanism, said feeding means, and said accumulating means operate cyclically and an operating cycle of said accumulating means is shorter than an operating cycle of said reading mechanism and said feeding means.

29. Apparatus according to claim 26, wherein said command circuit means are electrically energized by a switch actuated by a cam mounted on a drive shaft of the feeding means.

30. A matrix for use in automatic adding machines and the like adapted to receive, store and pass on electric signals, comprising a plurality of cells each defined by electric circuitry having a solid state device which becomes electrically conductive when subjected to a first, higher electric potential and which remains conductive when thereafter subjected to a second, lower electric potential, means for operatively coupling said devices with information receiving means, and means for operatively coupling said devices with information emitting means.

31. A matrix according to claim 30, wherein the information receiving means includes solenoids and wherein each of said devices is serially coupled with an energizing coil of another one of the solenoids, and including means for subjecting said coils to an electric potential causing a current through coils coupled with conductive devices sufficient to trigger the corresponding solenoids.

32. Apparatus according to claim 30, wherein the information receiving means includes a plurality of magnetically actuated means having coils serially connected with said devices and wherein said coils are selected so that said second potential does not cause the actuation of said magnetically actuated means.

33. A method for decoding data sequentially received from a data read-feed mechanism for the subsequent simultaneous entering in data accumulating means, the method comprising the steps of a. subjecting solid state devices in selected cells of a matrix to a first electric potential sufficient to make the selected devices conductive,
b. subjecting the solid states devices to a second potential sufficient to maintain them in a conductive condition after said first potential ceases, and
c. applying a third potential to all devices so that current can pass through the conductive devices and thereby enter said data in the accumulating means.

UNITED STATES PATENT OFFICE
CERTIFICATE OF CORRECTION

Patent No. 3,579,266 Dated May 18, 1971

Inventor(s) James E. Berardy

It is certified that error appears in the above-identified patent and that said Letters Patent are hereby corrected as shown below:

Column 4, line 5, delete -- "- --.
Column 4, line 6, change " compare" " to --"compare"--.
Column 4, line 47, change "wherever" to --whenever--.
Column 5, line 11, delete "REferring".
Column 7, line 68, change "s$_o$urce" to --source--.

Column 10, line 52, change "draws draws" to --draws--.
Column 10, line 62, change "218. its" to --218. Its--.
Column 10, line 64, change "not" to --nor--.
Column 11, line 17, change "replaced" to --primarily--.
Column 12, line 34, change "of" to --or--.
Column 12, line 54, change "The" to --To--.
Column 12, line 64, change "operated" to --operate--.
Column 15, line 61, change "reach" to --read--.
Column 16, line 7, change "includes" to --including--.
Column 16, line 21, change "reach" to --read--.
In the Abstract, line 8, change "sand" to --and--.

Signed and sealed this 9th day of November 1971.

(SEAL)
Attest:

EDWARD M.FLETCHER,JR.
Attesting Officer

ROBERT GOTTSCHALK
Acting Commissioner of Patents